(12) United States Patent
Dege et al.

(10) Patent No.: US 11,345,487 B2
(45) Date of Patent: May 31, 2022

(54) METHOD FOR TESTING OPERATION OF AN ARRESTING UNIT FOR LOCKING A FOLDABLE WING TIP PORTION IN AN EXTENDED POSITION

(71) Applicant: Airbus Operations GmbH, Hamburg (DE)

(72) Inventors: Saskia Dege, Hamburg (DE); Svenja Jegminat, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 867 days.

(21) Appl. No.: 16/193,054

(22) Filed: Nov. 16, 2018

(65) Prior Publication Data
US 2019/0152624 A1 May 23, 2019

(30) Foreign Application Priority Data
Nov. 17, 2017 (DE) ...................... 10 2017 127 193.7

(51) Int. Cl.
*B64F 5/60* (2017.01)
*B64C 3/56* (2006.01)
(Continued)

(52) U.S. Cl.
CPC .................. *B64F 5/60* (2017.01); *B64C 3/56* (2013.01); *G01N 3/22* (2013.01); *G06F 17/00* (2013.01);
(Continued)

(58) Field of Classification Search
CPC .... B64F 5/60; B64C 3/56; G01N 3/22; G01N 2203/0023; G01N 2203/0069; G06F 17/00
See application file for complete search history.

(56) References Cited

U.S. PATENT DOCUMENTS 5,381,986 A * 1/1995 Smith ....................... B64C 3/56
244/49
10,173,766 B2 1/2019 Good et al.
(Continued)

FOREIGN PATENT DOCUMENTS

CN 105438443 A * 3/2016 ............... B64C 3/56
CN 105438443 A 3/2016
(Continued)

OTHER PUBLICATIONS

Search Report for DE102017127193.7, dated Sep. 6, 2018, 5 pages.
(Continued)

*Primary Examiner* — Tung S Lau
(74) *Attorney, Agent, or Firm* — Nixon & Vanderhye P.C.

(57) ABSTRACT

A method for testing an arresting unit (15) for locking a foldable wing tip portion (11) to a wing (5) that includes a fixed wing (9), a foldable wing tip portion (11), and a folded position, an actuation unit (13) for actuating movement of the foldable wing tip portion (11), and an arresting unit (15) for locking the foldable wing tip portion (11). The method includes: locking the foldable wing tip portion (11) in the extended position by the arresting unit (15), controlling the actuation unit (13) to move the foldable wing tip portion (11) in the direction towards the folded position, such that the foldable wing tip portion (11) urges against the arresting unit (15) with a predefined test load, detecting deformation of the arresting unit (15) during or after application of the test load, and comparing the detected deformation to a predefined threshold deformation.

17 Claims, 2 Drawing Sheets

(51) Int. Cl.
*G01N 3/22* (2006.01)
*G06F 17/00* (2019.01)
(52) U.S. Cl.
CPC .............. *G01N 2203/0023* (2013.01); *G01N 2203/0069* (2013.01)

(56) References Cited

U.S. PATENT DOCUMENTS

| 2009/0173823 | A1 |   | 7/2009  | Shetzer  |            |
|--------------|----|---|---------|----------|------------|
| 2013/0292508 | A1 |   | 11/2013 | Fox      |            |
| 2016/0332721 | A1 | * | 11/2016 | Hancock  | B64C 3/56  |
| 2017/0113780 | A1 | * | 4/2017  | Boye     | B64C 23/072|

FOREIGN PATENT DOCUMENTS

| CN | 105799913 A  | * | 7/2016 | ............... B64C 3/56 |
| CN | 105799913 A  |   | 7/2016 | |
| CN | 106525477 A  | * | 3/2017 | .......... G01M 99/007 |
| CN | 106525477 A  |   | 3/2017 | |
| DE | 10 2015 014 635 | | 5/2017 | |
| EP | 2 727 829    |   | 5/2014 | |
| EP | 2 727 830    |   | 5/2014 | |
| EP | 3 000 723    |   | 3/2016 | |
| GB | 2530578      |   | 3/2016 | |
| GB | 201417175    |   | 3/2016 | |
| WO | 2009088961   |   | 7/2009 | |

OTHER PUBLICATIONS

European Search Report cited in EP 18202248.3, dated May 6, 2019, five pages.
Chinese Patent Office Search Report for Chinese Patent Application No. 201811359305.6 (dated Oct. 9, 2021).

* cited by examiner

```
┌─────────────────────────────────┐
│   locking the foldable wing tip │
│ portion in the extended position│
│      by the arresting unit      │
└─────────────────────────────────┘
                 │
┌─────────────────────────────────┐
│  controlling the actuation unit to │
│   move the foldable wing tip    │
│  portion in a direction towards │
│   the folded position, such that│
│   the foldable wing tip portion │
│  urges against the arresting unit│
│   with a predefined test load   │
└─────────────────────────────────┘
                 │
┌─────────────────────────────────┐
│   detecting deformation of the  │
│  arresting unit during or after │
│    application of the test load │
└─────────────────────────────────┘
                 │
┌─────────────────────────────────┐
│     comparing the detected      │
│ deformation to the predefined   │
│      threshold deformation      │
└─────────────────────────────────┘
```

FIG. 2

METHOD FOR TESTING OPERATION OF AN ARRESTING UNIT FOR LOCKING A FOLDABLE WING TIP PORTION IN AN EXTENDED POSITION

RELATED APPLICATION

This application claims priority to German Patent Application No. 10 2017 127 193.7 filed Nov. 17, 2017, the entirety of which is incorporated by reference.

FIELD OF INVENTION

The present invention relates to a method for testing operation of an arresting unit, in particular a method for testing health or structural integrity of the arresting unit. The arresting unit is configured for locking a foldable wing tip portion of a wing for an aircraft in an extended position, such as in a flight configuration. A further aspect of the invention relates to an aircraft configured for carrying out such a method.

BACKGROUND

Foldable wings comprise a fixed wing and a foldable wing tip portion mounted to the fixed wing in a foldable manner, such as pivotable either upwards or sideway or rearwards. To be folded upwards, the foldable wing tip portion may pivot about an axis extending in a horizontal plane and/or parallel to a wing chord direction and/or parallel to the wing surface and/or a flight direction. To be folded sideways, the foldable wing tip portion may pivot about a vertical axis and/or about an axis parallel to a wing thickness direction and/or about an axis normal to a plane including a wing chord direction and a wing span direction.

Foldable wings were developed to reduce space requirements of an aircraft during maneuver and parking on ground. During flight the foldable wing tip portions are locked in an extended position. After the aircraft has landed, the foldable wing tip portions are folded, such as folded upwards or rearwards, to reduce the overall span of the aircraft from wing tip to wing tip.

An arresting unit is provided to lock foldable wing tip portions in the extended position during flight. Since the arresting unit usually carries the full air loads of the foldable wing tip portion during flight, its correct operation, in particular its health and structural integrity, is essential. This means, high demands are made on maintenance of the arresting unit.

SUMMARY

The invention is disclosed herein may be embodied as a method for testing operation of the arresting unit, comprising the following steps:

First, a wing for an aircraft is provided. The wing comprises a fixed wing, a foldable wing tip portion, an actuation unit and an arresting unit. The fixed wing extends between a root end and a tip end. The foldable wing tip portion is mounted to the tip end of the fixed wing pivotally about an axis of rotation between an extended position, i.e. a flight position, and a folded position, i.e. a ground position. In the extended position the foldable wing tip portion extends in the wing span direction as an extension of the fixed wing. In the folded position the foldable wing tip portion is folded away and extends under an angle with respect to the wing span direction. The axis of rotation preferably extends in a wing chord direction or in a wing thickness direction. The actuation unit may include a motor, e.g. an electric motor combined with a gear box, and is configured for actuating movement of the foldable wing tip portion between the extended position and the folded position. The arresting unit is configured for locking the foldable wing tip portion in the extended position. The arresting unit may support the loads of the foldable wing tip portion during flight. The arresting unit may also be configured to additionally lock the foldable wing tip portion in the folded position.

As a next step, the foldable wing tip portion is locked in the extended position by the arresting unit.

Subsequently, the actuation unit is controlled, such as being commanded or activated, to move the foldable wing tip portion towards the folded position, such that the foldable wing tip portion urges, such as presses or pulls, against the arresting unit with a predefined test load. The predefined test load is applied at the arresting unit between the foldable wing tip portion and the fixed wing by the actuation unit to move the foldable wing tip portion out of the extended position towards the folded position.

During or after application of the test load deformation of the arresting unit, including fracture of the arresting unit, is detected.

Afterwards, the detected deformation is compared to a predefined threshold deformation. The predefined threshold deformation may correspond to a maximum allowable deformation that may be a deformation of no deformation at all to a predefined amount of deformation. If the detected deformation is greater than the maximum allowable deformation, issuing a report such as a warning, alert or other announcement indicating that there is excessive deformation. In response to the report of excessive deformation, the arresting unit may be taken out of service for repair or replacement.

The invention may be embodied as a simple and fast method to predict the operational health of an arresting unit and predict a need for repair or maintenance of the arresting unit. The method may be performed by a pilot during routine checks on the taxiway before the aircraft takes off or while the aircraft is taxing to a gate. Alternatively, the method may be performed by maintenance personnel while performing maintenance on an aircraft.

Deformation of the arresting unit may be detected by detecting, e.g., measuring, displacement or movement of the foldable wing tip portion relative to the fixed wing during application of the test load. Deformation may also be detected by detecting displacement or movement of the arresting unit or of the actuation unit during application of the test load. Detecting movement or displacement during application of the test load may be part of a simple and quick test to check the health of the arresting unit.

Deformation of the arresting unit may be detected, e.g., measured, by inspecting the structure of the arresting unit after application of the test load, such as during maintenance of the aircraft. Inspecting the arresting unit may further include measuring dimensions of components of the arresting unit, inspecting the components for microscopic cracks, and other failure and damage inspection techniques. These additional inspection techniques may be performed while or after application of the test load.

The test load may have a weight (mass) corresponding to an estimated maximum load that can be applied to the arresting unit during flight of the aircraft. Similarly, the weight of the test load may correspond to a maximum load the actuating unit is capable of withstanding. Applying test loads to an arresting unit that correspond to a maximum provides a simple method to test the arresting unit.

The arresting unit may include a latching device having a first latching part mounted to the fixed wing and a second latching part mounted to the foldable wing tip portion. One of the first and second latching parts may include a bolt while the other one of the first and second latching parts may include a corresponding hole or recess adapted for engagement with the bolt. The first and second latching parts may be moved relative to one another between a latched position, where the foldable wing tip portion is locked in the extended position, and an unlatched position, where the foldable wing tip portion is movable out of the extended position. The arresting unit may also include a locking device for securing the latching parts in the latched position.

The test load is applied between the first and second latching parts. The test load urges first and second latching parts against one another.

The arresting unit may include a plurality of latching device. Each latching device may include first and second latching parts. Multiple latching devices provide redundancy for the arresting unit and thereby enhances safe operation of the arresting unit.

The latching devices may each be controlled and movable independently from the other latching devices as they move between the latched position and the unlatched position. Latching devices that move independently may be tested individually to detect deformation.

During the deformation test, all latching devices should be in the latched position when the arresting unit is loaded with the test load. This allows all latching devices to be tested at the same time.

Alternatively, subsets of the latching devices may be subjected to a simultaneous deformation test, wherein the subset is loaded with the test load/While the subset is subjected to the test load, the remaining latching devices may be in an unlatched position and unloaded. The test load applied to the subset of latching devices may have a weight that is a proportion of the maximum load to be applied to the arresting unit that is a ratio of the subset of latching devices to all latching devices. The test load may be proportioned if the subset of latching devices is latched during the deformation test while the remaining latching devices are unlatched. In this way, each latching device of the subset of latching devices can be loaded with a test load that corresponds to proportion that the latching device would receive if the maxim load were applied to the arresting unit during flight of the aircraft when all latching devices are latched. Thus, the maxim load for the arresting unit during flight of the aircraft can be simulated at the latching devices, even if the actuation unit is not capable of applying a test load that corresponds to the maxim load occurring at the arresting unit during flight of the aircraft.

The invention may be embodied as aircraft including a fuselage, wings mounted to the fuselage, and a control unit. Each wing includes a fixed wing, a foldable wing tip portion, an actuation unit, and an arresting unit. The fixed wing extends between a root end and a tip end. The foldable wing tip portion is mounted to the tip end of the fixed wing pivotally about an axis of rotation between an extended position and a folded position. In the extended position, the foldable wing tip portion extends in a wing span direction as an extension of the fixed wing, wherein in the folded position the foldable wing tip portion is folded away and extends under an angle with respect to the wing span direction. The axis of rotation extends either in a wing chord direction or in a wing thickness direction.

The actuation unit is configured for actuating movement of the foldable wing tip portion between the extended position and the folded position. The arresting unit is configured for locking the foldable wing tip portion in the extended position.

The control unit is configured for controlling the aircraft to carry out the method according to any of the afore-described embodiments. In particular, the control unit is configured for controlling the arresting unit to lock the foldable wing tip portion in the extended position, controlling the actuation unit to move the foldable wing tip portion in the direction towards the folded position, such that the foldable wing tip portion urges against the arresting unit with a predefined test load, detecting deformation of the arresting unit during or after application of the test load, and comparing the detected deformation to a predefined threshold deformation, such as a maximum allowable deformation, which may be no deformation at all.

The control unit may include or be connected to a sensor configured for detecting deformation of the arresting unit by detecting displacement or movement of the foldable wing tip portion relative to the fixed wing during application of the test load. The sensor may be formed as a displacement sensor or as a movement sensor. Alternatively, the sensor may be configured to detect deformation of the arresting unit by detecting displacement or movement of the arresting unit or of the actuation unit during application of the test load.

The arresting unit includes a latching device having a first latching part mounted to the fixed wing and a second latching part mounted to the foldable wing tip portion. One of the first and second latching parts may include a bolt while the other may include a corresponding hole or recess adapted for engagement with the bolt. The first and second latching parts move relative to one another between a latched position, where the foldable wing tip portion is locked in the extended position, and an unlatched position, where the foldable wing tip portion is movable out of the extended position.

The test load may be applied between the first and second latching parts to urge the first and second latching parts urge against one another.

The arresting unit may include a plurality of latching devices, wherein each latching device includes first and second latching parts. Each latching device, or subset of latching devices, is movable and controllable independently from one another between the latched position and the unlatched position.

SUMMARY OF DRAWINGS

FIG. 2 is a flow chart of a method.

DETAILED DESCRIPTION

Figure 1:
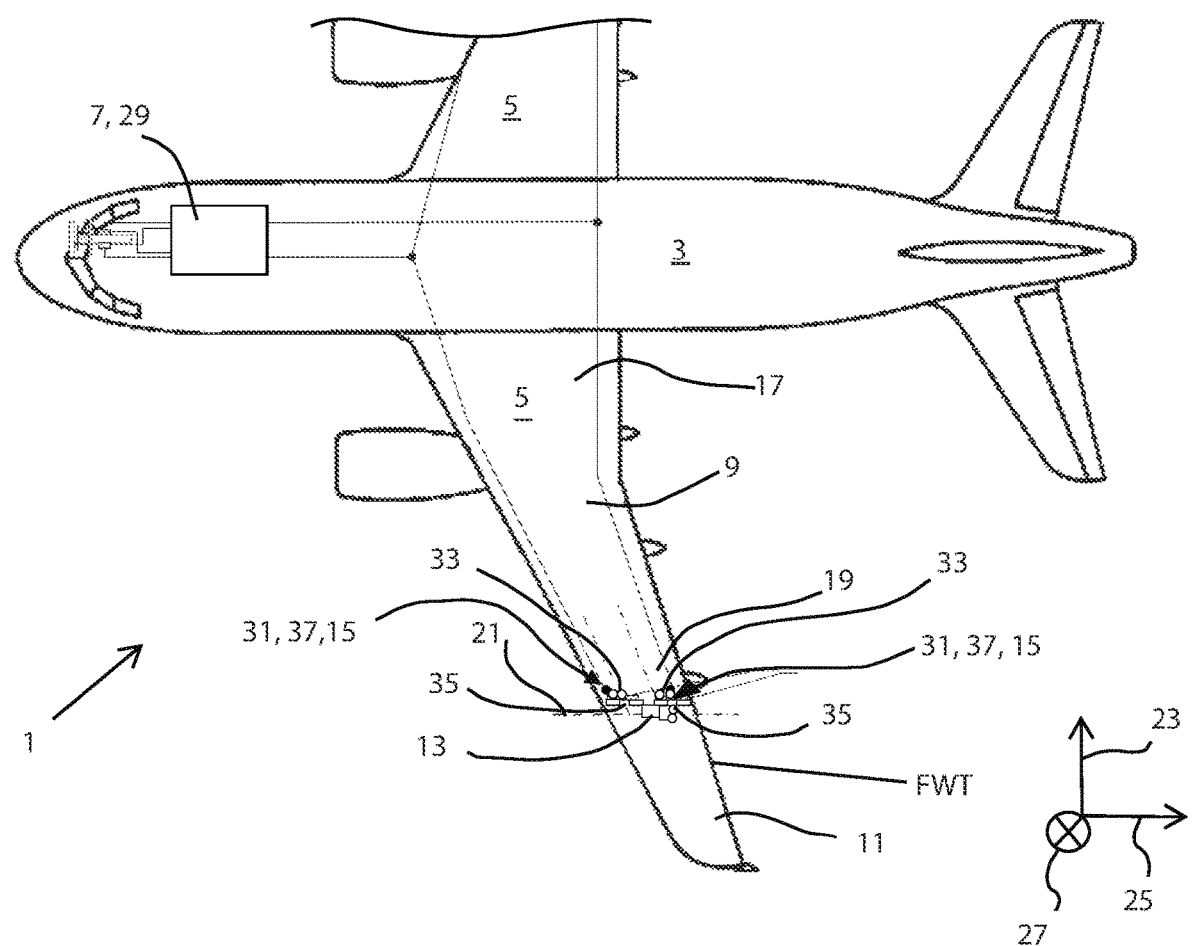
FIG. 1 is a top view of an aircraft including an arresting device and an actuation unit.

FIG. 1 shows an aircraft 1 including a fuselage 3, wings 5 mounted to the fuselage 3, and a control unit 7.

Each wing 5 includes a fixed wing 9, a foldable wing tip portion 11, an actuation unit 13, and an arresting unit 15. The fixed wing 9 extends between a root end 17 at the fuselage and a tip end 19 distal to the fuselage. The foldable wing tip portion 11 is mounted to the tip end 19 of the fixed wing 9 such that the foldable wing tip portion pivots about an axis of rotation 21 between an extended position and a folded position. In the extended position, the foldable wing tip portion 11 extends in a wing span direction 23 as an extension of the fixed wing 9, wherein in the folded position the foldable wing tip portion 11 is folded away and extends under an angle with respect to the wing span direction 23. The axis of rotation 21 extends in a wing chord direction 25, but in other embodiments might also extend in a wing thickness direction 27.

The actuation unit 13 is configured for actuating movement of the foldable wing tip portion 11 between the extended position and the folded position. The arresting unit 15 is configured for locking the foldable wing tip portion 11 in the extended position. The control unit 7 is configured for controlling the aircraft 1 to carry out the following method for testing operation of the arresting unit 15:

As shown in FIG. 2, first the foldable wing tip portion 11 is locked in the extended position by the arresting unit 15. Subsequently, the actuation unit 13 is controlled to move the foldable wing tip portion 11 in the direction towards the folded position, such that the foldable wing tip portion 11 urges against the arresting unit 15 with a predefined test load. During application of the test load deformation of the arresting unit 15 is detected. Deformation of the arresting unit 15 is detected by a sensor 29 detecting displacement or movement of the foldable wing tip portion 11 relative to the fixed wing 9 during application of the test load. Afterwards, the detected deformation is compared to a predefined threshold deformation. The predefined threshold deformation corresponds to a maximum allowable deformation of the arresting unit 15.

The arresting unit 15 comprises a plurality of latching devices 31. Each latching device 31 comprises a first latching part 33 mounted to the fixed wing 9 and a second latching part 35 mounted to the foldable wing tip portion 11. First and second latching parts 33, 35 can be moved relative to one another between a latched position, where the foldable wing tip portion 11 is locked in the extended position, and an unlatched position, where the foldable wing tip portion 11 is movable out of the extended position. In the present embodiment, the first latching part 33 comprises a bolt and the second latching part 35 comprises a corresponding hole adapted for engagement with the bolt. The test load is applied between the first and second latching parts 33, 35. The arresting unit 15 further comprises a plurality of locking devices 37 for securing first and second latching parts 33, 35 in the latched position.

The latching devices 31 are controlled and movable independently from one another between the latched position and the unlatched position. When the arresting unit 15 is loaded with the test load, only a subset of latching devices 31 is in the latched position while the remaining latching devices 31 are in the unlatched position. Each latching device 31 of the subset of latching devices 31 is loaded with a test load share that corresponds to the respective share of an estimated maximum load occurring at the arresting unit 15 during flight of the aircraft 1. In such a way, the estimated maximum load occurring at the arresting unit 15 during flight of the aircraft 1 can be simulated at the latching devices 31, even with an actuation unit 13 that is not strong enough to apply a test load that corresponds to the estimated maximum load occurring at the arresting unit 15 during flight of the aircraft 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method comprising a testing operation of an arresting unit for locking a foldable wing tip portion of a wing for an aircraft in an extended position, wherein the wing includes a fixed wing, a foldable wing tip portion mounted to the fixed wing pivotally about an axis of rotation between an extended position and a folded position, an actuation unit configured to actuate movement of the foldable wing tip portion between the extended position and the folded position, and an arresting unit configured to lock the foldable wing tip portion in the extended position, wherein the method includes:
   locking the foldable wing tip portion in the extended position by the arresting unit;
   controlling the actuation unit to move the foldable wing tip portion in a direction towards the folded position, such that the foldable wing tip portion urges against the arresting unit with a predefined test load,
   detecting deformation of the arresting unit during or after application of the test load, and
   comparing the detected deformation to the predefined threshold deformation.

2. The method according to claim 1, wherein deformation of the arresting unit is detected by detecting displacement or movement of the foldable wing tip portion during application of the test load.

3. The method according to claim 1, wherein deformation of the arresting unit is detected by inspecting the structure of the arresting unit after application of the test load.

4. The method according claim 1, wherein the test load corresponds to an estimated maximum load occurring at the arresting unit during flight of the aircraft.

5. The method according to claim 1, wherein the test load corresponds to a maximum load of the actuating unit.

6. The method according to claim 1, wherein the arresting unit includes at least one latching device comprising a first latching part mounted to the fixed wing and a second latching part mounted to the foldable wing tip portion, wherein the method further includes:
   moving the first and second latching parts relative to one another to a latched position at which the foldable wing tip portion is locked in the extended position, and
   and thereafter the test load is applied between the first and second latching parts.

7. The method according to claim 6, wherein the at least one latching device is a plurality of latching devices.

8. The method according to claim 7, wherein the plurality of latching devices are movable independently from one another between the latched position and an unlatched position.

9. The method according to claim 7, wherein all of the plurality of latching devices are in the latched position when the arresting unit is loaded with the test load.

10. The method according to claim 8, wherein only a subset of the plurality of latching devices are in the latched position when the arresting unit is loaded with the test load, while other of the plurality of latching devices remain in in the unlatched position.

11. An aircraft comprising:
a fuselage,
wings mounted to the fuselage, and
a control unit,
wherein each wing includes a fixed wing, a foldable wing tip portion, an actuation unit, and an arresting unit,
wherein the foldable wing tip portion is mounted to the fixed wing pivotally about an axis of rotation between an extended position and a folded position,
wherein the actuation unit is configured for actuating movement of the foldable wing tip portion between the extended position and the folded position,
wherein the arresting unit is configured for locking the foldable wing tip portion in the extended position, and
wherein the control unit is configured to:
control the arresting unit to lock the foldable wing tip portion in the extended position,
control the actuation unit to move the foldable wing tip portion in the direction towards the folded position, such that the foldable wing tip portion urges against the arresting unit with a predefined test load,
detect deformation of the arresting unit during or after application of the test load, and
compare the detected deformation to a predefined threshold deformation.

12. The aircraft according to claim 11, wherein the control unit comprises a sensor configured to detect deformation of the arresting unit by detecting displacement or movement of the foldable wing tip portion during application of the test load.

13. The aircraft according to claim 11, wherein the arresting unit comprises a latching device,
wherein the latching device comprises a first latching part mounted to the fixed wing and a second latching part mounted to the foldable wing tip portion,
wherein first and second latching parts move relative to one another between a latched position, where the foldable wing tip portion is locked in the extended position, and an unlatched position, where the foldable wing tip portion is movable out of the extended position, and
wherein the test load is applied between the first and second latching parts.

14. The aircraft according to claim 13, wherein the arresting unit comprises a plurality of latching devices.

15. The aircraft according to claim 14, wherein the latching devices are movable independently from one another between the latched position and the unlatched position.

16. A method to test an arresting unit, wherein a wing of an aircraft includes a fixed wing, a foldable wing tip portion pivotably mounted to the fixed wing, an actuation unit configured to move pivot the foldable wing tip portion between an extended position and a folded position, and the arresting unit which is configured to lock the foldable wing tip portion in the extended position, wherein the method includes:
locking the foldable wing tip portion in the extended position by the arresting unit;
controlling the actuation unit to move the foldable wing tip portion towards the folded position, such that the foldable wing tip portion urges against the arresting unit with a predefined test load,
detecting deformation of the arresting unit during or after application of the test load;
comparing the detected deformation to the predefined threshold deformation, and
if the detected deformation exceeds the predefined threshold deformation, issuing a report of excessive deformation.

17. The method of claim 16 further including repairing or replacing the arresting unit if the detected deformation exceeds the predefined threshold deformation.

* * * * *